(12) United States Patent
Oba

(10) Patent No.: US 6,459,601 B1
(45) Date of Patent: Oct. 1, 2002

(54) CONTROL CIRCUIT OF POWER CONVERTER

(75) Inventor: Norio Oba, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/092,466

(22) Filed: Mar. 8, 2002

(30) Foreign Application Priority Data

Oct. 18, 2001 (JP) ........................................ 2001-320305

(51) Int. Cl.⁷ .............................................. H02M 1/12
(52) U.S. Cl. .......................... 363/131; 363/137; 363/41; 323/207
(58) Field of Search ....................... 307/39, 11; 363/41, 363/131, 34, 137; 323/207; 318/439

(56) References Cited

U.S. PATENT DOCUMENTS 5,903,128 A * 5/1999 Sakakibara et al. .......... 318/439

FOREIGN PATENT DOCUMENTS

JP          2000-316284     11/2000

OTHER PUBLICATIONS

Particulars: "Electric Society Compendium" vol. 12B, No. 2, 1986, pp. 9–16 No month.

* cited by examiner

*Primary Examiner*—Shawn Riley
(74) *Attorney, Agent, or Firm*—Leydig, Voit & Mayer, Ltd.

(57) ABSTRACT

A control circuit of a power converter selecting an optimal mode for reducing the switching of switching elements. The control circuit includes a current instruction generator for providing current instruction values to a current loop which controls output currents of a power converter, a current deviation vector detector for calculating current deviations between the current instruction values and corresponding feedback values, respectively; a voltage detector for calculating a voltage vector of three-phase voltage generators, and a PWM pattern selector for selecting a PWM pattern for the power converter. When the current deviation vector deviates from the allowable deviation range, the PWM pattern selector selects a switching mode for the power converter from among switching modes limited by values of the current deviation vector and the voltage vector, and outputs the PWM pattern selected.

6 Claims, 15 Drawing Sheets

| AREAS | SELECTED VOLTAGE VECTORS |
|---|---|
| [P1] | V0,V1,V3,V7 |
| [P2] | V0,V2,V3,V7 |
| [P3] | V0,V2,V6,V7 |
| [P4] | V0,V4,V6,V7 |
| [P5] | V0,V4,V5,V7 |
| [P6] | V0,V1,V5,V7 |

[Q7] : ALLOWABLE RANGE

FIG. 16

| MODES | SWITCHING STATES | | |
|---|---|---|---|
| | W / Z | V / Y | U / X |
| k0 | OFF / ON | OFF / ON | OFF / ON |
| k1 | OFF / ON | OFF / ON | ON / OFF |
| k2 | OFF / ON | ON / OFF | OFF / ON |
| k3 | OFF / ON | ON / OFF | ON / OFF |
| k4 | ON / OFF | OFF / ON | OFF / ON |
| k5 | ON / OFF | OFF / ON | ON / OFF |
| k6 | ON / OFF | ON / OFF | OFF / ON |
| k7 | ON / OFF | ON / OFF | ON / OFF |

FIG. 17

| AREAS OF VB | AREAS OF ΔI | | | | | | |
|---|---|---|---|---|---|---|---|
| | [Q1] | [Q3] | [Q2] | [Q6] | [Q4] | [Q5] | [Q7] |
| [P1] | k1 | k3 | k3 | k0,k7 | k0,k7 | k1 | HOLD |
| [P3] | k3 | k3 | k2 | k2 | k0,k7 | k0,k7 | HOLD |
| [P2] | k0,k7 | k2 | k2 | k6 | k6 | k0,k7 | HOLD |
| [P6] | k0,k7 | k0,k7 | k6 | k6 | k4 | k4 | HOLD |
| [P4] | k5 | k0,k7 | k0,k7 | k4 | k4 | k5 | HOLD |
| [P5] | k1 | k1 | k0,k7 | k0,k7 | k5 | k5 | HOLD |

CONTROL CIRCUIT OF POWER CONVERTER

This application is based on Application No. 2001-320305, filed in Japan on Oct. 18, 2001, the contents of which are hereby incorporated by reference.

BACKGROUND OF THE INVENTION

1. Field of the Invention

The present invention relates to a control circuit of a power converter (of the instantaneous current waveform control type), including switching elements which perform a plurality of switching operations in one cycle, for controlling the instantaneous magnitude of an output current of the power converter, and more specifically, it relates to a control circuit of a power converter such as a sinusoidal wave voltage output type inverter, including a motor driving inverter, a high power factor converter, an active filter and an LC filter.

2. Description of the Prior Art

FIG. 12 is a block diagram illustrating a known control circuit of a power converter, which is, for example, a control circuit of an inverter described in a section entitled "CURRENT CONTROL TYPE PWM INVERTER CAPABLE OF HARMONIC CONTROL AND HIGH-SPEED CURRENT RESPONSE" (pages 9–16) in "Institute of Electrical Engineers proceedings", Vol. 12B, No. 2 (1986), and modified into a control configuration associated with the present invention.

The control circuit shown in FIG. 12 is constructed as a current control loop for performing instantaneous current control.

In FIG. 12, the power converter in the form of a main circuit of a three-phase inverter 1 is comprised of a full bridge arrangement of three pairs of switching elements Tr1–Tr6, as shown in FIG. 13 for instance.

Current sensors 10U, 10V and 10W are connected with three output terminals, respectively, of the three-phase inverter 1 for detecting inverter currents IAU, IAV and IAW output from the three-phase inverter 1.

The current sensors 10U–10W constitute, together with a feedback control circuit (to be described later), a current loop for controlling the instantaneous magnitudes of the output currents IAU–IAW of the three-phase inverter 1.

A load 2 (for instance, three-phase motor) is connected with an output side of the three-phase inverter 1 and is provided with internal inductances 21U, 21V and 21W on which alternating current (AC) voltages VBU, VBV and VBW of U phase, V phase and W phase are imposed, respectively, and internal induction voltage sources 22U, 22V and 22W connected with the internal inductances 21U–21W, respectively.

The internal induction voltage sources 22U–22W generate counter electromotive forces VBOU, VBOV and VBOW for the internal inductances 21U–21W as three-phase induced voltages.

A direct current power supply 4 is connected with the three-phase inverter 1 for supplying a direct current (DC) source voltage VD to the three-phase inverter 1.

A three-phase sinusoidal wave current instruction generation circuit 801 generates current instruction values IAU*, IAV*, and IAW* of three-phase sinusoidal waves (to be supplied from the three-phase inverter 1) to the current loop formed on the output side of the three-phase inverter 1.

A current deviation vector detection circuit 802 calculates a voltage deviation vector associated with the internal induction voltage sources 22U–22W. A counterelectromotive force estimation circuit 803 estimates counterelectromotive forces VBOU–VBOW generated in the load 2.

A PWM pattern table circuit 804 determines the pattern of a PWM pulse for the three-phase inverter 1 in accordance with the output signals of the current deviation vector detection circuit 802 and the counterelectromotive force estimation circuit 803.

Adder-subtracters 851U, 851V and 851W are connected with the output side of the three-phase sinusoidal wave current instruction generation circuit 801.

The three-phase sinusoidal wave current instruction generation circuit 801 and the adder-subtracters 851U–851W together constitute a current instruction generation means, and calculate current deviations (current deviation vector) $\Delta iU$, $\Delta iV$ and $\Delta iW$ between the current instruction values IAU*–IAW* and the inverter currents (current feedback values) IAU–IAW, respectively.

Now, reference will be made to the operation of the known control circuit of the power converter as shown in FIG. 12 and FIG. 13 while referring to FIG. 14 through FIG. 17.

FIG. 14 and FIG. 15 are vector diagrams for explaining the operation of the known control circuit of the power converter.

In FIG. 14, there are shown eight kinds of voltage vectors V0–V7 which are output according to the states of the switching elements Tr1–Tr6 in the three-phase inverter 1, and six areas [P1]–[P6] delimited by the respective voltage vectors V0–V7.

In FIG. 15, there are shown an area [Q7] indicating that a current deviation vector $\Delta I$ is in an allowable range, and outer peripheral areas [Q1]–[Q6] indicating that the current deviation vector $\Delta I$ (e.g., $\Delta Ia$ or $\Delta Ib$) is outside the allowable range.

FIG. 16 is an explanatory view which shows switching modes k0–k7 corresponding to the eight kinds of voltage vectors V0–V7, and switching states (ON/OFF) of the switching elements Tr1–Tr6 in the three-phase inverter 1 in the respective switching modes.

FIG. 17 is an explanatory view which shows a matrix condition for selecting switching modes k0–k7, wherein the horizontal direction of the matrix corresponds to the current deviation vector $\Delta I$ and the vertical direction thereof corresponds to counterelectromotive force vector VB, respectively.

First of all, in FIG. 12, the adder-subtracters 851U–851W together constituting the current instruction generation means calculate current deviations $\Delta iU$–$\Delta iW$ between current instruction values IAU*–IAW* generated from the three-phase sinusoidal wave current instruction generation circuit 801, and inverter currents IAU–IAW detected by the current sensors 10U–10W.

Then, the counterelectromotive force vector estimation circuit 803 estimates counterelectromotive forces VBU––VBW generated at input ends of the load 2 from the current deviations $\Delta iU$–$\Delta iW$, calculates the counterelectromotive force vector VB, and detects in which one of the areas [P1]–[P6] (see FIG. 14) the counterelectromotive force vector VB exists.

In addition, the current deviation vector detection circuit 802 calculates the current deviation vector $\Delta I$ from the current deviations $\Delta iU$–$\Delta iW$, and detects in which one of the areas [Q1]–[Q7] (see FIG. 15) the current deviation vector $\Delta I$ exists.

When a prescribed allowable range for the current deviation vector ΔI determined according to the accuracy of the current control is set, the area [Q7] in FIG. 15 shows that the current deviation vector ΔI is in the allowable range.

Moreover, the areas [Q1]–[Q6] outside the area [Q7] shows that the current deviation vector ΔI (e.g., ΔIa or ΔIb) is outside the allowable range.

The PWM pattern table circuit 804 selects the switching modes k0–k7 from the areas [P1]–[P6] of the counterelectromotive force vector VB and the areas [Q1]–[Q7] of the current deviation vector ΔI according to the two dimensional map of FIG. 17.

Moreover, the PWM pattern table circuit 804 determines the switching states of the switching elements Tr1–Tr6 (see FIG. 16) in the three-phase inverter 1 from the switching modes k0–k7.

In FIG. 17, in cases where the counterelectromotive force vector VB exists in the area [P1] for instance, the switching mode k1 is selected if the current deviation vector ΔI exists in the area [Q1] or [Q5], and the switching mode k3 is selected if the current deviation vector ΔI exists in the area [Q2] or [Q3].

In cases where the counterelectromotive force vector VB is in the area [P1], the switching mode k0 or k7 is selected if the current deviation vector ΔI exists in the area [Q4] or [Q6], and the switching mode at that time is maintained as it is if the current deviation vector ΔI exists in the area [Q7].

The respective switching elements Tr1–Tr6 in the three-phase inverter 1 are controlled to be turned on or off based on a switching instruction from the PWM pattern table circuit 804.

As a result, the inverter currents IAU–IAW are controlled to coincide with the current instruction values IAU*–IAW*.

Next, reference will be made to how the current deviation vector ΔI changes in accordance with the above-mentioned control.

For example, let us consider that the counterelectromotive force vector VB is in the area [P1] in FIG. 14, and the current deviation vector ΔI is indicated at ΔIa in the area [Q1] in FIG. 15.

In this state, the switching mode k1 is selected according to the map of FIG. 17, and the current deviation vector ΔI moves in the direction of a difference vector VL1 between the counterelectromotive force vector VB and the voltage vector V1 (see FIG. 14).

At this time, the current deviation vector ΔI or ΔIa, which exists in the area [Q1] outside the allowable range as indicated at an arrow in FIG. 15, comes into the area [Q7] in the allowable range.

However, in cases where the current deviation vector ΔI is located at a position of ΔIb in FIG. 15, even if the switching mode k1 is selected, the current deviation vector ΔI or ΔIb does not come into the area [Q7], but after having once moved into the area [Q3], the current deviation vector ΔI moves, by the switching mode k3 being selected from the conditions of the area [P1] and the area [Q3], in the direction of VL3 (see FIG. 14), entering the area Q7 in the allowable range.

In this case, if the switching mode k3 has been selected immediately at the instant when the current deviation vector ΔI is located in ΔIb (i.e., in [Q1]), the current deviation vector ΔI moves along a broken line in FIG. 15 from the current deviation vector ΔIb, so that the current deviation vector ΔI can be moved into the area [Q7] in the allowable range by changing the switching mode at one time.

However, this is not considered at all in the above-mentioned known control circuit.

As described above, the known control circuit of the power converter has the following problem; that is, it is sometimes impossible to select an optimal switching mode at one time in which the current deviation vector ΔI can enter the allowable range, and hence additional or extra switching is required, as a consequence of which losses of the switching elements Tr1–Tr6 are increased, reducing the efficiency of the three-phase inverter 1 (power converter).

SUMMARY OF THE INVENTION

The present invention is intended to obviate the problems as referred to above, and has for its object to provide a control circuit of a power converter which is capable of selecting an optimal switching mode for reducing the number of times of switchings.

Bearing the above object in mind, according to a first aspect of the present invention, there is provided a control circuit of a power converter which includes switching elements performing a plurality of times of switchings in one cycle, and which is connected with a three-phase voltage generator through reactors. The control circuit comprises: a current loop having a current sensor inserted in each of output terminals of the power converter for controlling an instantaneous magnitude of a corresponding output current of the power converter; current instruction generation means for providing current instruction values to the current loop; current deviation vector detection means for calculating a current deviation vector between the current instruction values and corresponding current feedback values from the current sensor; voltage detection means for calculating a voltage vector of the three-phase voltage generator; and PWM pattern selection means for selecting a PWM pattern for the power converter in accordance with the current deviation vector and the voltage vector. The PWM pattern selection means sets an allowable deviation range for the current deviation vector, and selects a switching mode for the power converter from among switching modes limited by values of the current deviation vector and the voltage vector when the current deviation vector deviates from the allowable deviation range, and outputs the PWM pattern. With this arrangement, it is possible to select an optimal switching mode for reducing the number of times of switchings.

In a preferred form of the first aspect of the present invention, the PWM pattern selection means calculates a passing-through time in which the current deviation vector passes through the allowable deviation range, and selects the switching mode in accordance with the passing-through time. Thus, it is possible to select an optimal switching mode for further reducing the number of times of switchings.

In another preferred form of the first aspect of the present invention, the PWM pattern selection means weights a specific switching mode determined by values of the voltage vector in accordance with the passing-through time, and preferentially outputs the specific switching mode to the power converter. Accordingly, even when the voltage vector is not selected based on the commercial power supply voltage vector, it is possible to select an optimal switching mode for reducing the number of times of switchings.

In a further preferred form of the first aspect of the present invention, when amounts of changes per unit time of the current instruction values are larger than a prescribed amount, the voltage detection means corrects the voltage vector by products of time derivatives of the current instruction values and inductance values of the reactors, respectively. Thus, even if the current instruction value changes, it is possible to select an optimal switching mode for reducing the number of times of switchings.

According to a second aspect of the present invention, there is provided a control circuit of a power converter which includes switching elements performing a plurality of times of switchings in one cycle, and which supplies three-phase AC voltages to a three-phase load through a filter circuit comprising reactors and capacitors. The control circuit comprises: a current loop having a current sensor inserted in each of output terminals of the power converter for controlling an instantaneous magnitude of a corresponding output current of the power converter; a voltage loop for controlling an instantaneous magnitude of each of output voltages of the power converter; voltage instruction generation means for providing voltage instruction values to the voltage loop; voltage deviation detection means for calculating voltage deviations between the voltage instruction values and corresponding voltage feedback values, respectively; voltage control means for outputting current instruction values for the current loop in accordance with the voltage deviations, respectively; current deviation vector detection means for calculating a current deviation vector between the current instruction values and corresponding current feedback values from the current sensor; and PWM pattern selection means for selecting a PWM pattern for the power converter in accordance with the current deviation vector and the voltage instruction values. The PWM pattern selection means sets an allowable deviation range for the current deviation vector, and selects a switching mode for the power converter from among switching modes limited by the current deviation vector and the voltage instruction values when the current deviation vector deviates from the allowable deviation range, and outputs the PWM pattern; and the voltage control means outputs the current instruction values so as to decrease the voltage deviation vector. With this arrangement, it is possible to select an optimal switching mode for reducing the number of times of switchings.

In a preferred form of the second aspect of the present invention, when amounts of changes per unit time of the current instruction values are larger than a prescribed amount, the voltage instruction generation means corrects the voltage instruction values by products of time derivatives of the current instruction values and inductance values of the reactors, respectively. Thus, even if the current instruction value changes, it is possible to select an optimal switching mode for reducing the number of times of switchings.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 16 is an explanatory view showing the switching modes selected according to the known control circuit of the power converter.

FIG. 17 is an explanatory view showing the switching modes selected according to the known control circuit of the power converter.

DESCRIPTION OF PREFERRED EMBODIMENTS

Hereinafter, preferred embodiments of the present invention will be described in detail while referring to the accompanying drawings.

First Embodiment

Figure 1:
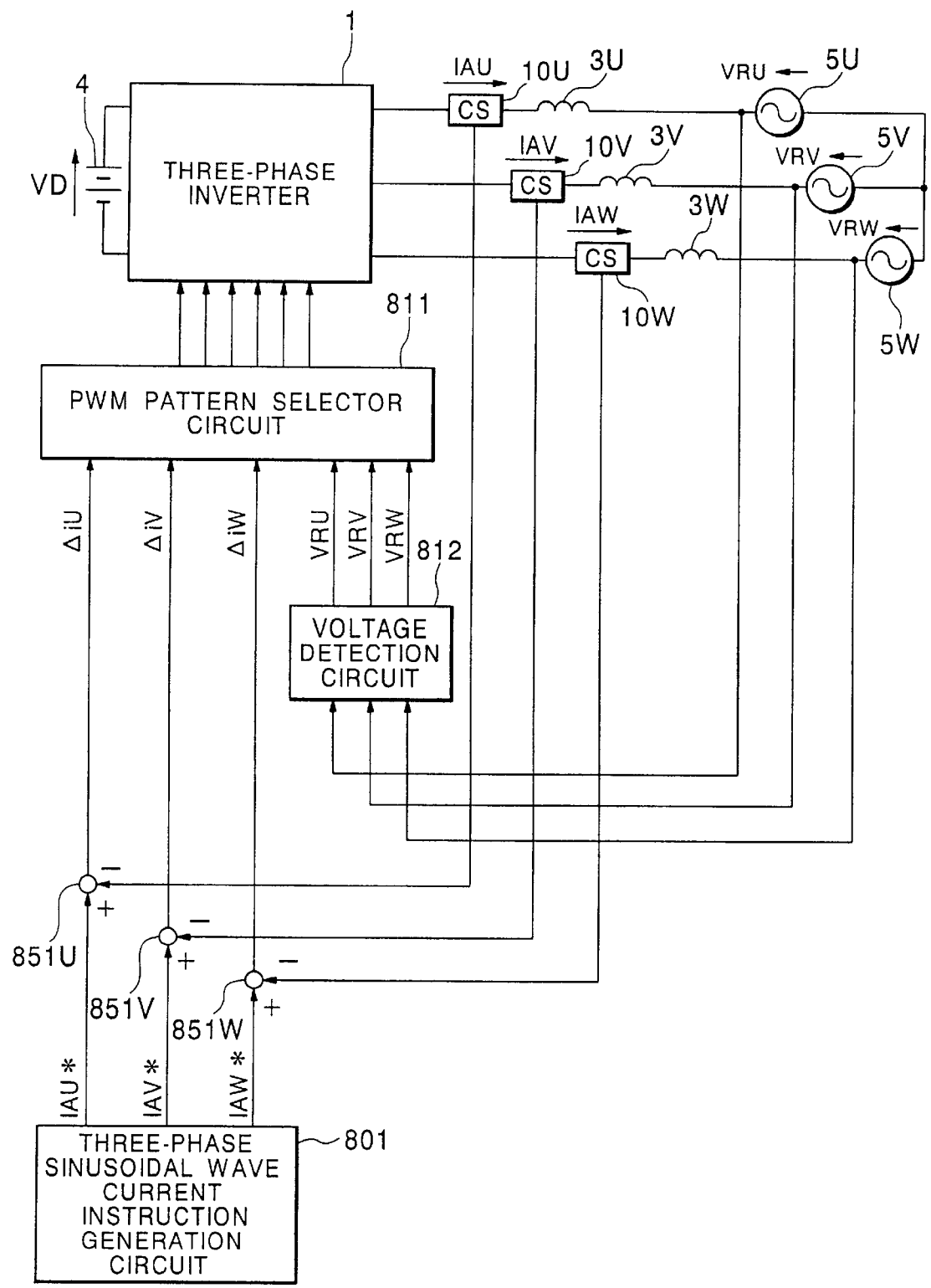
FIG. 1 is a block diagram showing a first embodiment of the present invention.

A first embodiment of the present invention will be described below with reference to the accompanying drawings. FIG. 1 is a block diagram which shows the first embodiment of the present invention.

In FIG. 1, the same or corresponding parts of this embodiment as those of the aforementioned known apparatus are identified by the same symbols while omitting a detailed description thereof.

Reactors 3U, 3V and 3W inserted in an output side of a three-phase inverter 1 are connected with output terminals of the three-phase inverter 1 through current sensors 10U–10W, respectively.

A three-phase voltage generator in the form of commercial power supplies 5U, 5V and 5W corresponds to the above-mentioned internal induction voltage sources 22U–22W, and is connected with the output terminals of the three-phase inverter 1 through the reactors 3U–3W.

The three-phase inverter 1 operates as a system interconnection inverter (high power factor converter, etc.), and, controls currents flowing to the reactors 3U–3W to currents of sinusoidal waveform with a power-factor "1" with respect to the commercial power supplies 5U–5W, for instance.

A PWM pattern selector circuit 811 corresponding to the PWM pattern table circuit 804 functions as a switching mode selection means.

A voltage detection circuit 812 detects voltages VRU, VRV and VRW of the commercial power supplies 5U–5W as voltage vectors VR.

Figure 12:
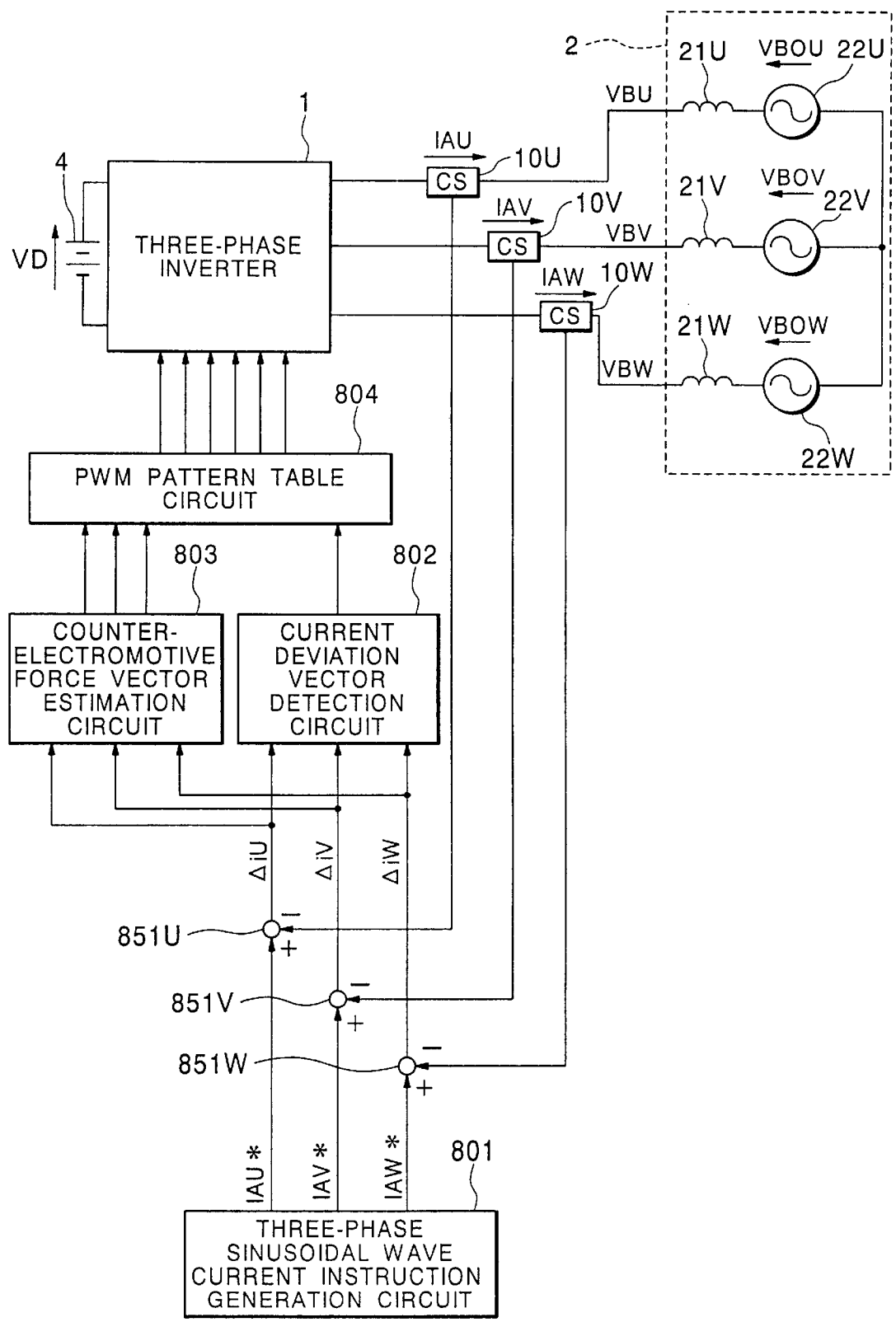
FIG. 12 is a block diagram showing a known control circuit of a power converter.

The voltage detection circuit 812 may estimate actual voltage values from current deviations ΔiU–ΔiW, etc., as in the case of the above-mentioned known control circuit (i.e., circuits 802, 803 in FIG. 12).

The PWM pattern selector circuit 811 selects a switching mode from the current deviations ΔiU–ΔiW calculated by adder-subtracters 851U–851W and the respective voltages VRU–VRW of the commercial power supplies 5U–5W detected by the voltage detection circuit 812.

Moreover, the PWM pattern selector circuit 811 outputs on/off signals (PWM patterns) which correspond to the selected switching modes to the respective switching elements Tr1–Tr6 (see FIG. 13) in the three-phase inverter 1.

In addition, the PWM pattern selector circuit 811 sets an allowable deviation range for the current deviation vector ΔI (ΔiU, ΔiV, ΔiW), as will be described later, and when the current deviation vector ΔI departs or deviates from the allowable deviation range, the PWM pattern selector circuit 811 selects a switching mode for the three-phase inverter 1 from among the switching modes limited by values of the current deviation vector ΔI and the voltage vector VR (VRU–VRW) of the commercial power source, and outputs a corresponding PWM pattern.

Figure 14:
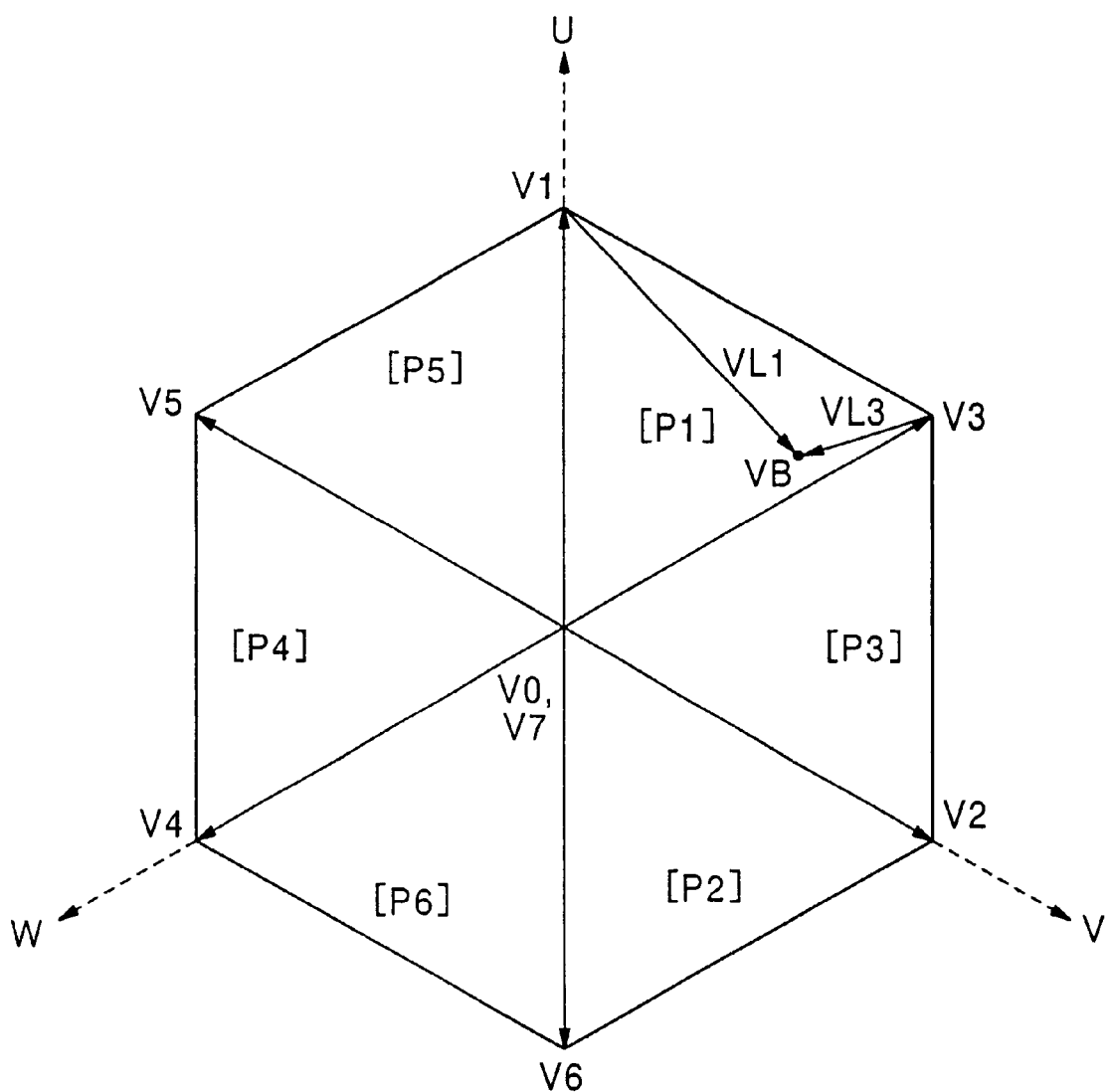
FIG. 14 is a vector diagram explaining switching modes selected according to the known control circuit of the power converter.
Figure 15:
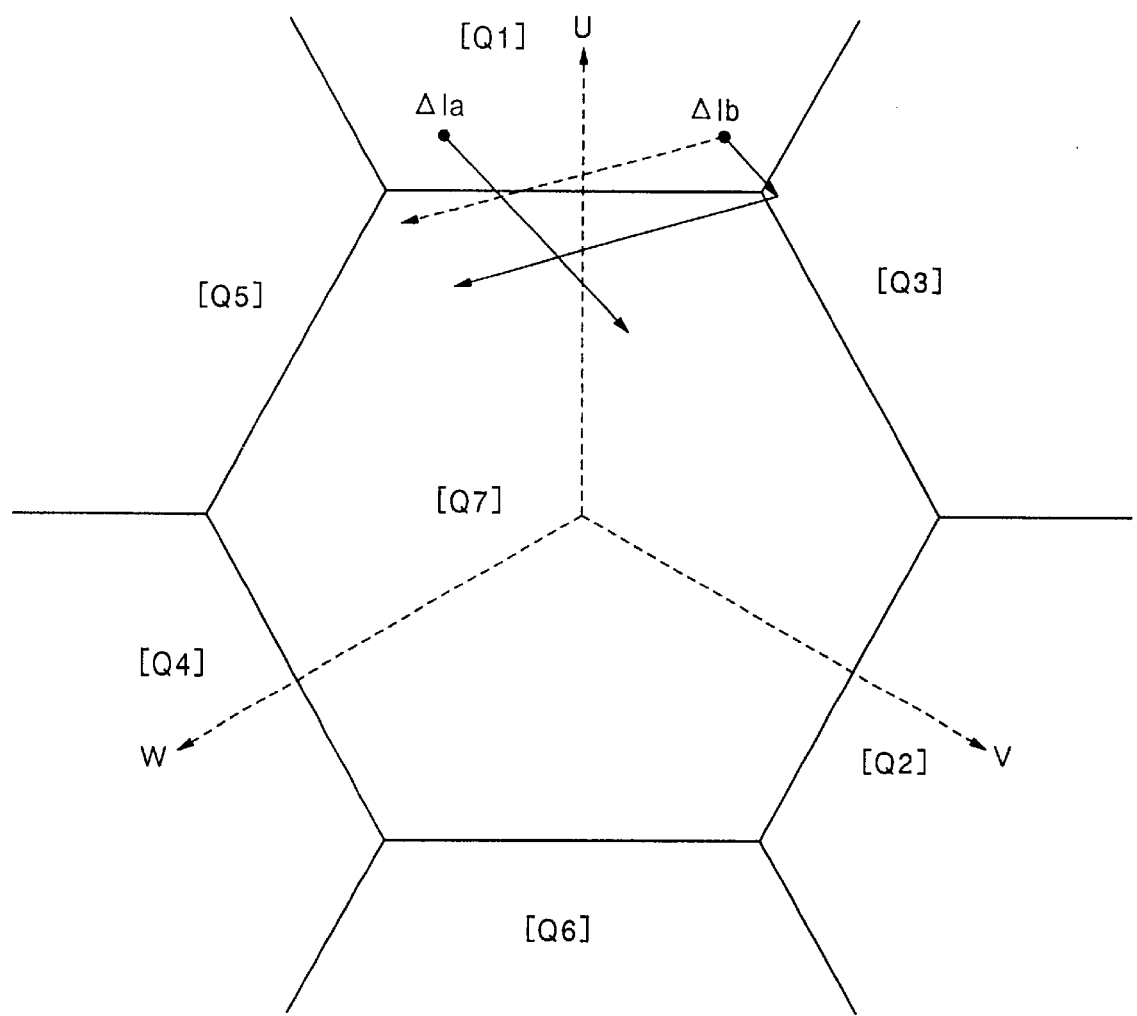
FIG. 15 is a vector diagram explaining the switching modes selected according to the known control circuit of the power converter.

As described before, in the switching elements Tr1–Tr6 in the three-phase inverter 1, eight kinds of voltage vectors can be taken under the condition that one of upper and lower arms for each of three pairs of upper and lower arms is on and the other is off, and the respective voltage vectors can be represented by UVW coordinates, as shown in FIG. 14.

Further, when switching modes k0–k7 are defined for the output voltage vectors V0–V7 in FIG. 14, the ON/OFF states of the respective switching elements Tr1–Tr6 are shown in FIG. 16.

Figure 13:
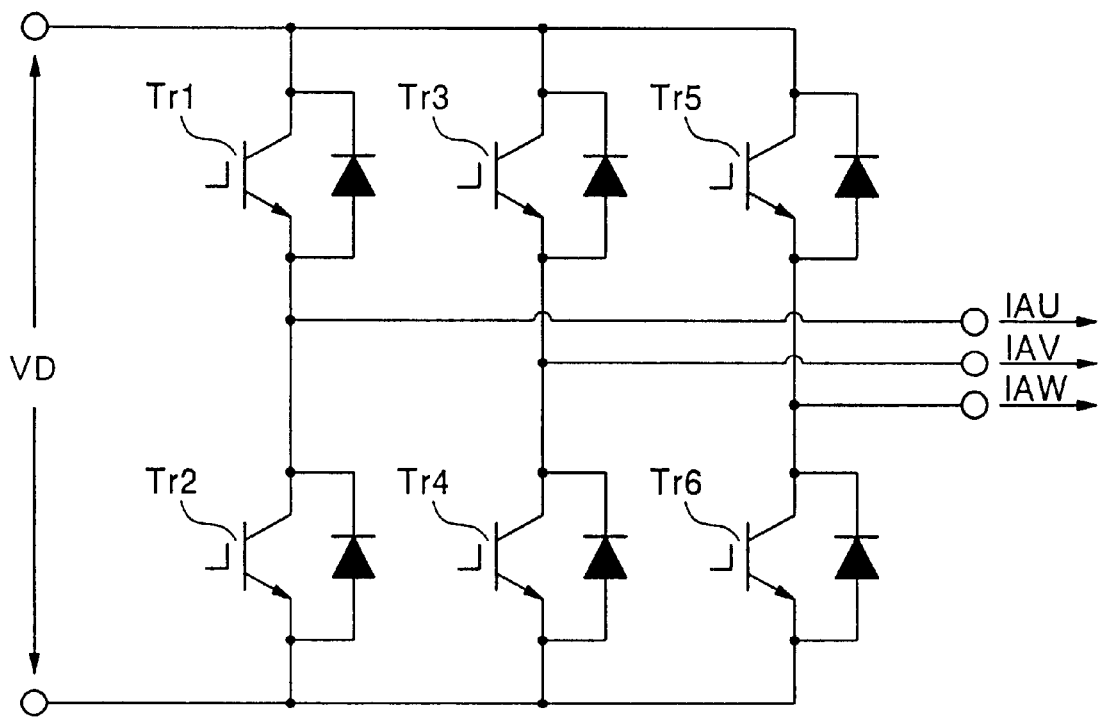
FIG. 13 is a circuit diagram showing a concrete configuration example of a three-phase inverter in FIG. 12.

Symbols U, V, W, X, Y and Z in FIG. 16 correspond to the switching elements Tr1, Tr3, Tr5, Tr2, Tr4 and Tr6, respectively, in FIG. 13.

Moreover, the switching modes k1–k6 correspond to voltage-having vectors of constant magnitudes.

On the other hand, the switching mode k0 corresponds to a switching state in which the three phases U, V and W of the upper arms are all off and the three phases X, Y and Z of the lower arms are all on, and the switching mode k7 corresponds to a switching state in which the three phases U, V and W of the upper arms are all on and the three phases X, Y and Z of the lower arms are all off.

Accordingly, both of the switching modes k0 and k7 correspond to a zero voltage vector having a magnitude of "0".

Figure 2:
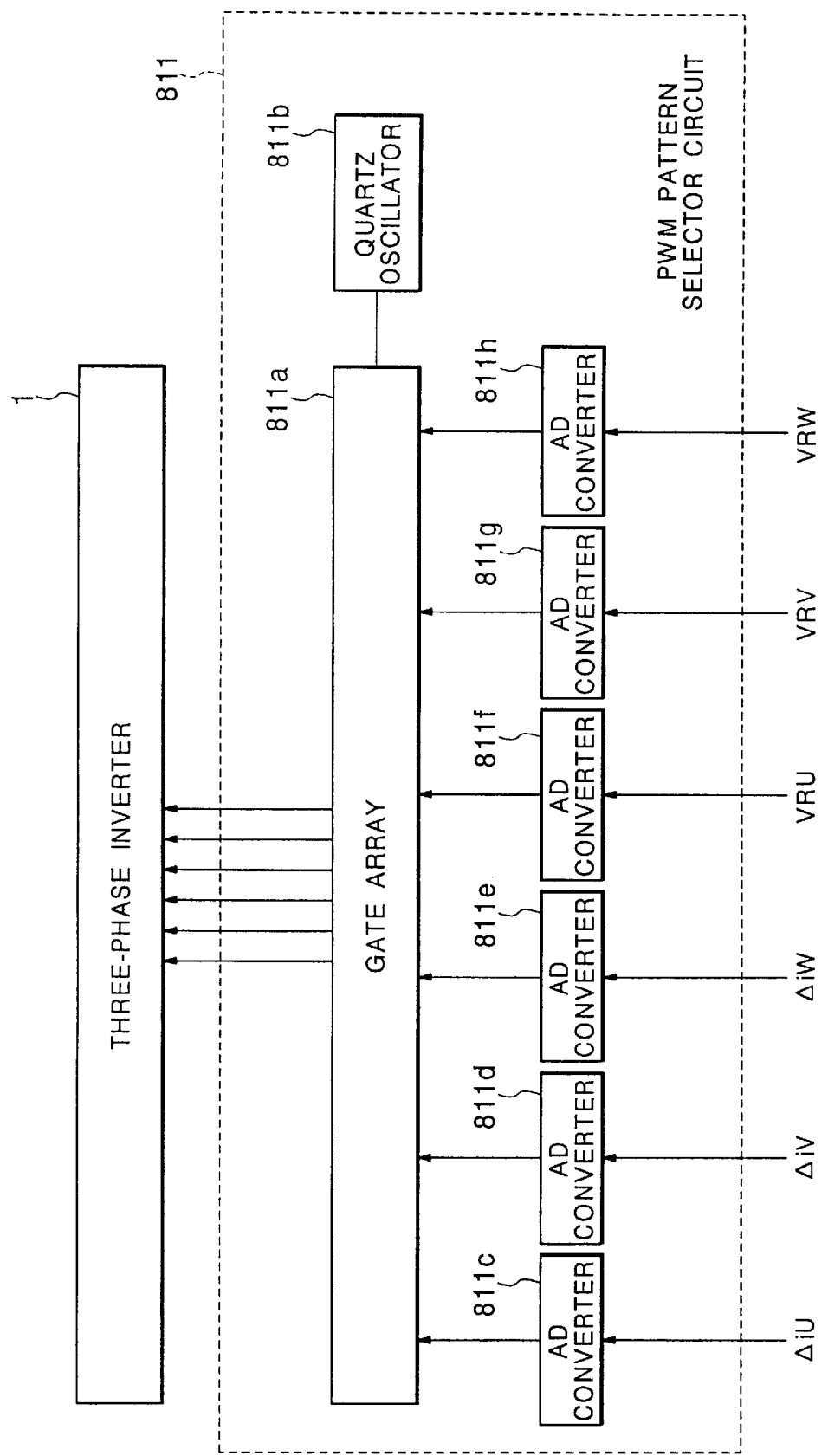
FIG. 2 is a block diagram showing in detail the arrangement of a PWM pattern selector circuit in FIG. 1.

In order to select and output a switching mode for controlling the current deviations ΔiU–ΔiW so as to be within the allowable values with the current deviations ΔiU–ΔiW and the commercial power supply voltages VRU––VRW being taken as input information, the PWM pattern selector circuit 811 is comprised of a digital control circuit as shown in FIG. 2 for instance.

FIG. 2 is a block diagram showing an exemplary configuration of the PWM pattern selector circuit 811.

In FIG. 2, symbol 811a designates a gate array, and symbol 811b designates a quartz oscillator for generating a reference signal that defines operation timing of the gate array 811a.

AD converters 811c–811h are connected in parallel with an input side of the gate array 811a. The AD converters 811c–811h convert the current deviations ΔiU–ΔiW and the commercial power supply voltages VRU–VRU all in the form of analog singals into corresponding digital signals, respectively, and inputs them to the gate array 811a.

The gate array 811a takes in the current deviations ΔiU–ΔiW and the commercial power supply voltages VRU––VRW at intervals of about 1μ second to 100μ seconds through the AD converters 811c–811h, and calculates a switching mode for controlling the current deviations ΔiU–ΔiW so as to be within the allowable values.

Now, reference will be made to the processing operation of the gate array 811a according to the first embodiment of the present invention while referring to a flow chart of FIG. 3 and an explanatory view of FIG. 4 together with FIGS. 13 through 16.

Figures 4, 5:
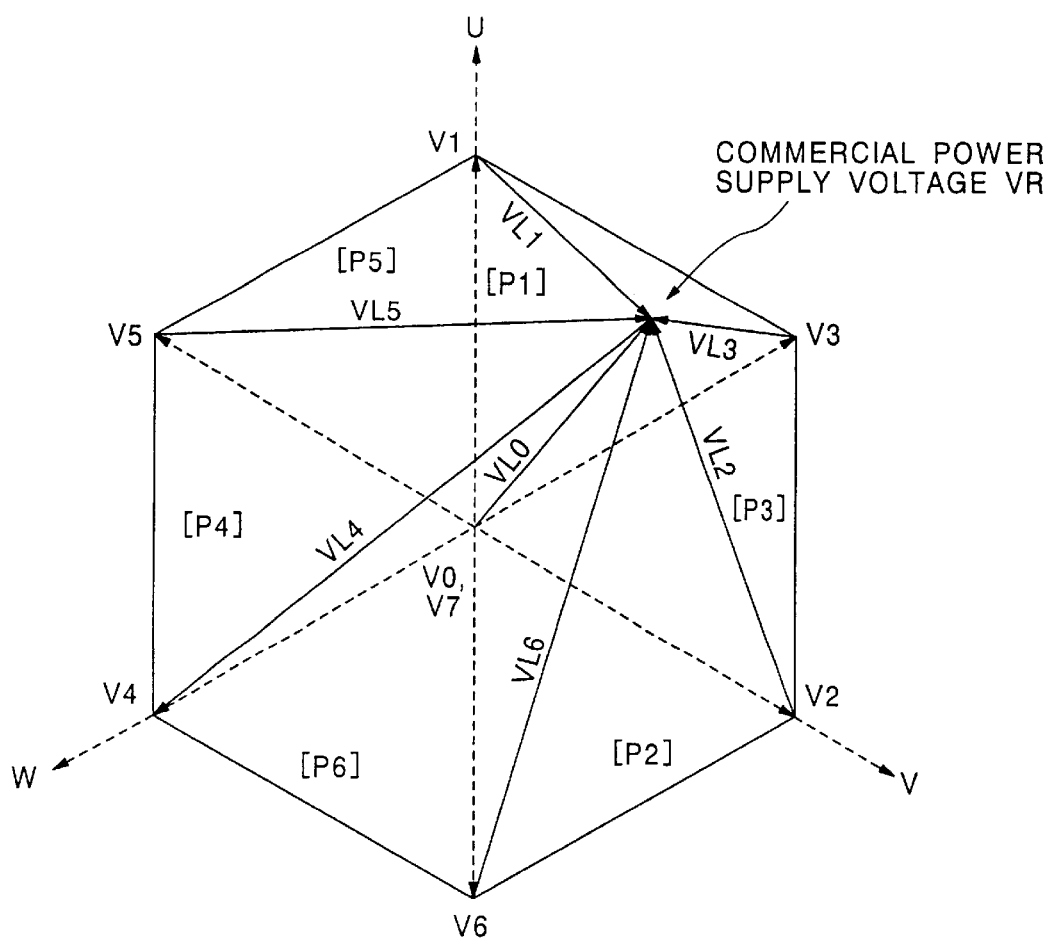
FIG. 4 is an explanatory view showing voltage vectors selected according to the first embodiment of the present invention.
FIG. 5 is a vector diagram explaining switching modes selected according to the first embodiment of the present invention.

FIG. 4 shows output voltage vectors of the three-phase inverter 1 selected according to the areas [P1]–[P6] of the commercial power supply voltage vector VR, illustrating, in this case, respective combinations of four voltage vectors selected from among the eight voltage vectors V0–V7.

The voltage vectors V0–V7 are values selected according to the switching modes k0–k7, respectively, and correspond to the switching modes k0–k7, respectively.

Figure 3:
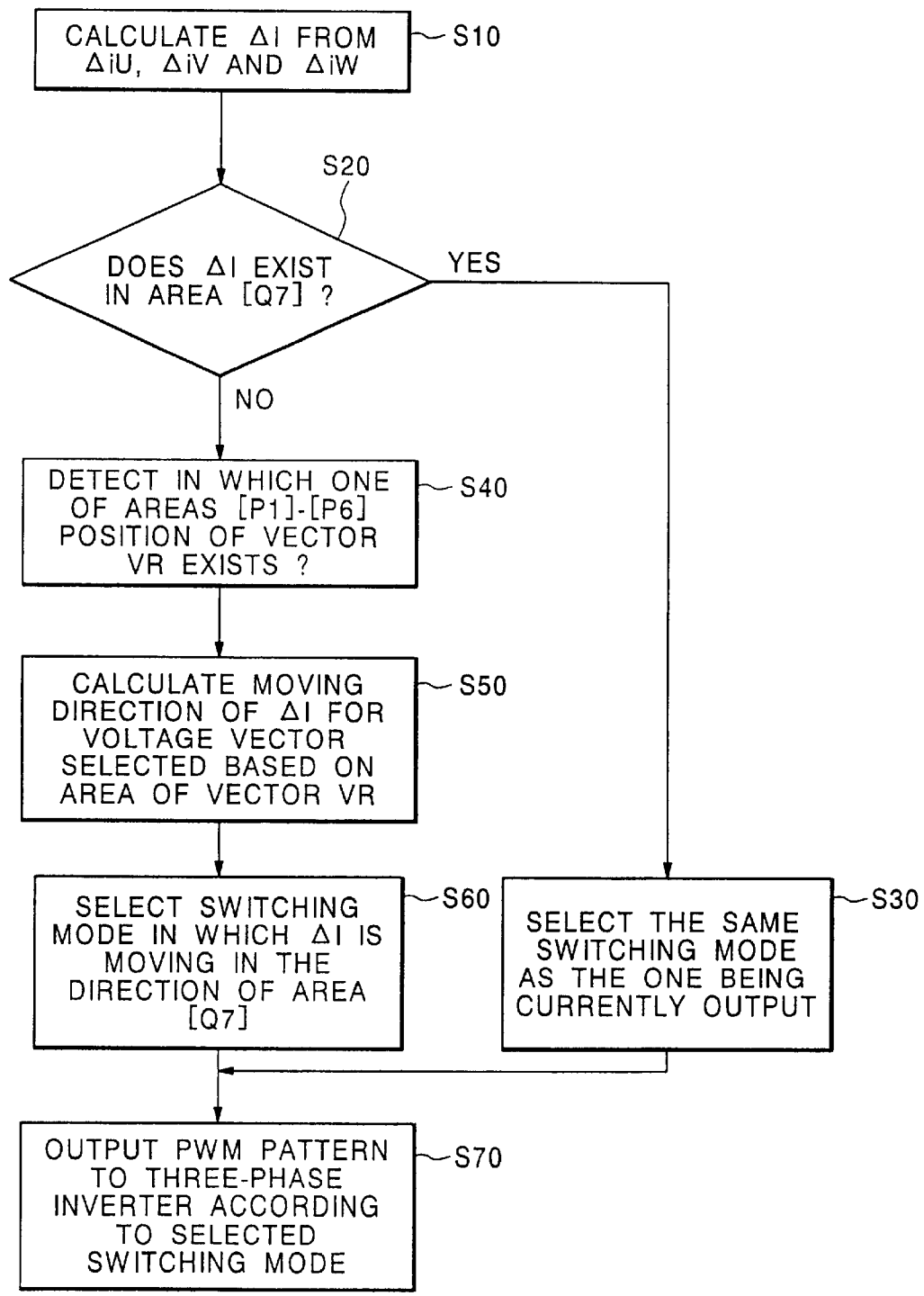
FIG. 3 is a flow chart showing the processing operation of the first embodiment of the present invention.

In FIG. 3, the current deviation vector ΔI is first calculated from the current deviations ΔiU–ΔiW (step S10), and it is determined whether the current deviation vector ΔI exists in the area [Q7] (see FIG. 15)(step S20).

When it is determined in step S20 that the current deviation vector ΔI exists in the area [Q7] (that is, YES), the same switching mode is selected so as not to change the switching mode being currently output (step S30), and the control process proceeds to step S70.

On the other hand, when it is determined in step S20 that the current deviation vector ΔI is not in the area [Q7] (that is, NO), it is then detected in which one of the areas P1–P6 (see FIG. 14) the commercial power supply voltage vector VR calculated from the commercial power supply voltages VRU–VRW is located (step S40).

Subsequently, it is determined, based on the area where the commercial power supply voltage vector VR is located, in which direction the current deviation vector ΔI is moving, for each of the cases in which the three-phase inverter 1 outputs four voltage vectors, respectively, selected according to FIG. 4 (step S50).

Here, note that the direction in which the current deviation vector ΔI is moving is the direction of a difference vector between the commercial power supply voltages VRU––VRU and the output voltages VI of the three-phase inverter 1, as will be described later.

Then, a switching mode is selected such that a voltage vector with the moving direction of the current deviation vector ΔI oriented toward the area [Q7] is output among the output voltage vectors of the three-phase inverter 1 selected according to FIG. 4 (step S60), and the control process proceeds to step S70.

Finally, in step S70, a PWM pattern (that is, on/off instructions for the respective switching elements Tr1–Tr6) corresponding to the selected switching mode is prepared and output.

Here, note that the size of the area [Q7] corresponds to the allowable range of the current deviation vector ΔI, and the deviations ΔiU–ΔiW between the current instruction values IAU*–IAW* and the inverter currents IAU–IAW are each proportional to the size or length of a corresponding side of a hexagon of the area [Q7].

Moreover, although in this embodiment, the shape of the area [Q7] has been set to a hexagonal configuration so as to correspond to the current deviations ΔiU–ΔiW of the respective phases, it may be any configuration such as a circle, a quadrangle, etc., as long as the allowable deviation is satisfied.

Next, reference will be made to the reason why the moving direction of the current deviation vector ΔI becomes the direction of the difference vector between the commercial power supply voltages VRU–VRU and the inverter output voltages.

In general, a relation among an inverter output voltage (vector) VA, a commercial power supply voltage (vector) VR and a voltage vector VL imposed on the reactors 3U–3W is represented by the following expression (1).

$$VL = L \times di/dt = VA - VR \quad (1)$$

where L is an inductance value of the reactors 3U–3W.

Here, let us consider the case in which the voltage vector VL is imposed on the reactors 3U–3W; the current at time T1 is IA(T1); the current after a predetermined time ΔT has elapsed from time T1 is IA (T1+ΔT); and the commercial power supply voltage (vector) VR is constant for a period from time T1 to time (T1+ΔT). In this case, the amount of current changed for the predetermined time ΔT is represented by the following expression (2).

$$IA(T1+\Delta T) - IA(T1) = (\Delta T/L) \times VL(\Delta T/L) \times (VA-VR) \quad (2)$$

Moreover, a current deviation Δi (T1+ΔT) between the current IA (T1+ΔT) and the inverter current instruction value IA* (T1+ΔT) at time (T1+ΔT) is represented by the following expression (3).

$$\Delta i(T1+\Delta T) = IA^*(T1+\Delta T) - IA(T1+\Delta T) \quad (3)$$

In addition, in this case, assuming that the inverter current instruction value IA* is constant for a period from time T1 to time (T1+ΔT), the following expression (4) is established from expressions (2) and (3) above.

$$\Delta i(T1+\Delta T) - \Delta i(T1) = (\Delta T/L) \times (VR-VA) \quad (4)$$

It will be understood from expression (4) above that if the commercial power supply voltage (vector) VR and the inverter current instruction value IA* are assumed to be constant for a predetermined period of time ΔT, a change per predetermined time ΔT of the current deviation Δi is determined by a difference between the commercial power supply voltage (vector) VR and the inverter output voltage (vector) VA.

Although the current deviation Δi is represented by a scalar quantity in the above-mentioned expressions, if it is expanded to a vector in UVW coordinates, the current deviation vector ΔI will move in the direction of the difference vector between the commercial power supply voltage vector VR and the inverter output voltage vector VA.

Here, a description will be made referring to vector diagrams of FIG. 5 and FIG. 6.

As shown in FIG. 5, in cases where the commercial power supply voltage vector VR exists in the area [P1], the output voltage vectors V0, V1, V3 and V7 of the three-phase inverter 1 are selected from the table shown in FIG. 4, in step S40 of FIG. 3.

In this case, difference vectors between the commercial power supply voltage vector VR and the selected voltage vectors V0, V1, V3 and V7 become VL0, VL1 and VL3 in FIG. 5. Here, note that VL0 is a difference vector corresponding to the zero vectors V0 and V7.

Figure 6:
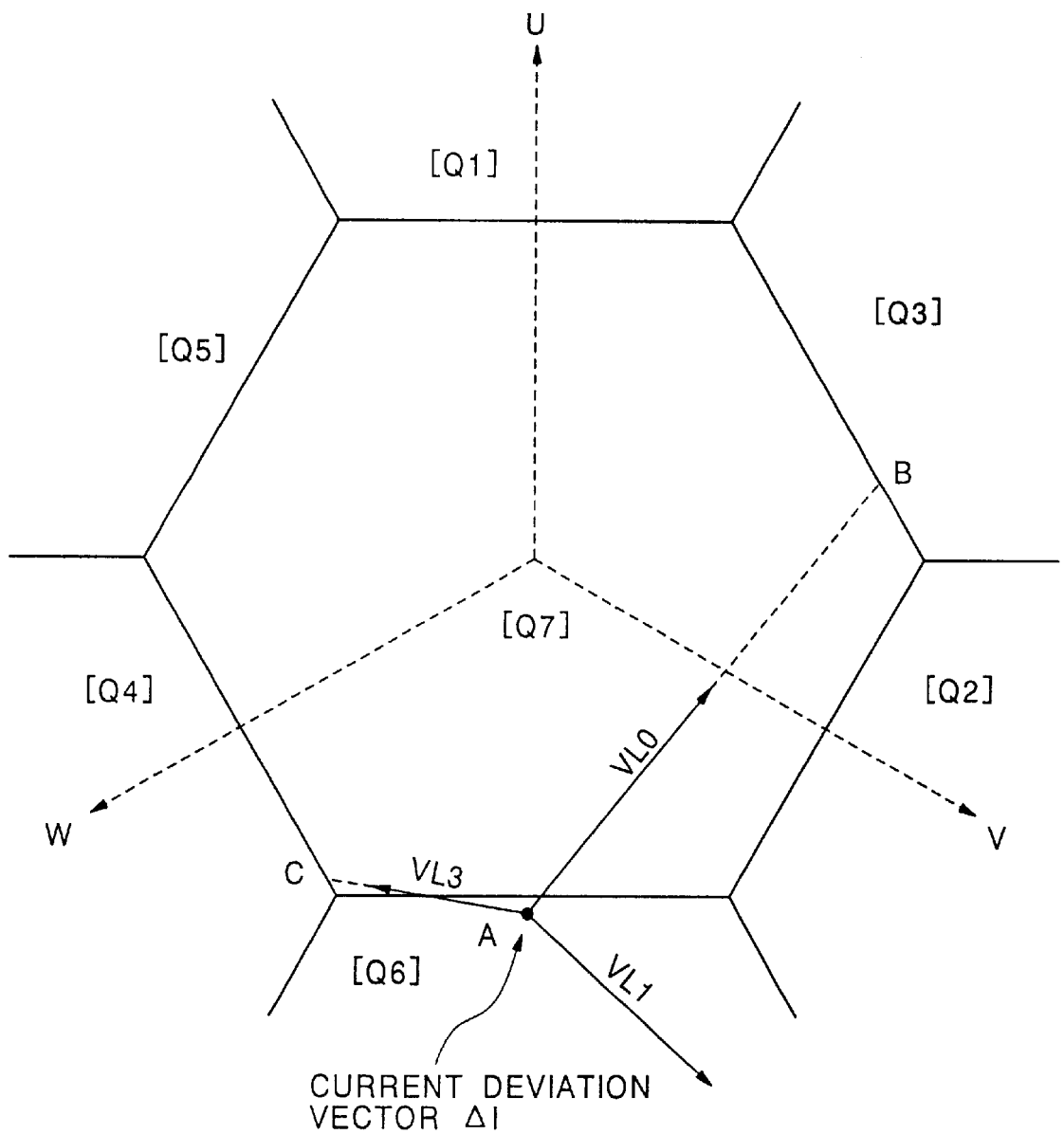
FIG. 6 is a vector diagram explaining switching modes selected according to a second embodiment of the present invention.

Since the current deviation vector ΔI moves in the direction of the difference vector as described above, when the current deviation vector ΔI is in a position "A" within the area [Q6] as shown in FIG. 6 for instance, the current deviation vector ΔI moves in the direction of the area [Q7] if the difference vector is VL0 or VL3.

As a result, it will be understood that in this case, any of the switching modes k0, k3 and k7 may be selected.

Thus, it is possible to promptly select an appropriate switching mode for making the current deviation vector ΔI fall within the allowable range (e.g., area [Q7]), so unnecessary switching can be avoided.

Second Embodiment

Although in the above-mentioned first embodiment, a switching mode in which the current deviation vector ΔI is moving in the direction of the area [Q7] has only been determined, in cases where there are two or more switching modes in which the current deviation vector ΔI is moving in the direction of the area [Q7], an optimal switching mode may be selected such that the change interval of the switching mode becomes longer than those of the other switching modes.

Figure 7:
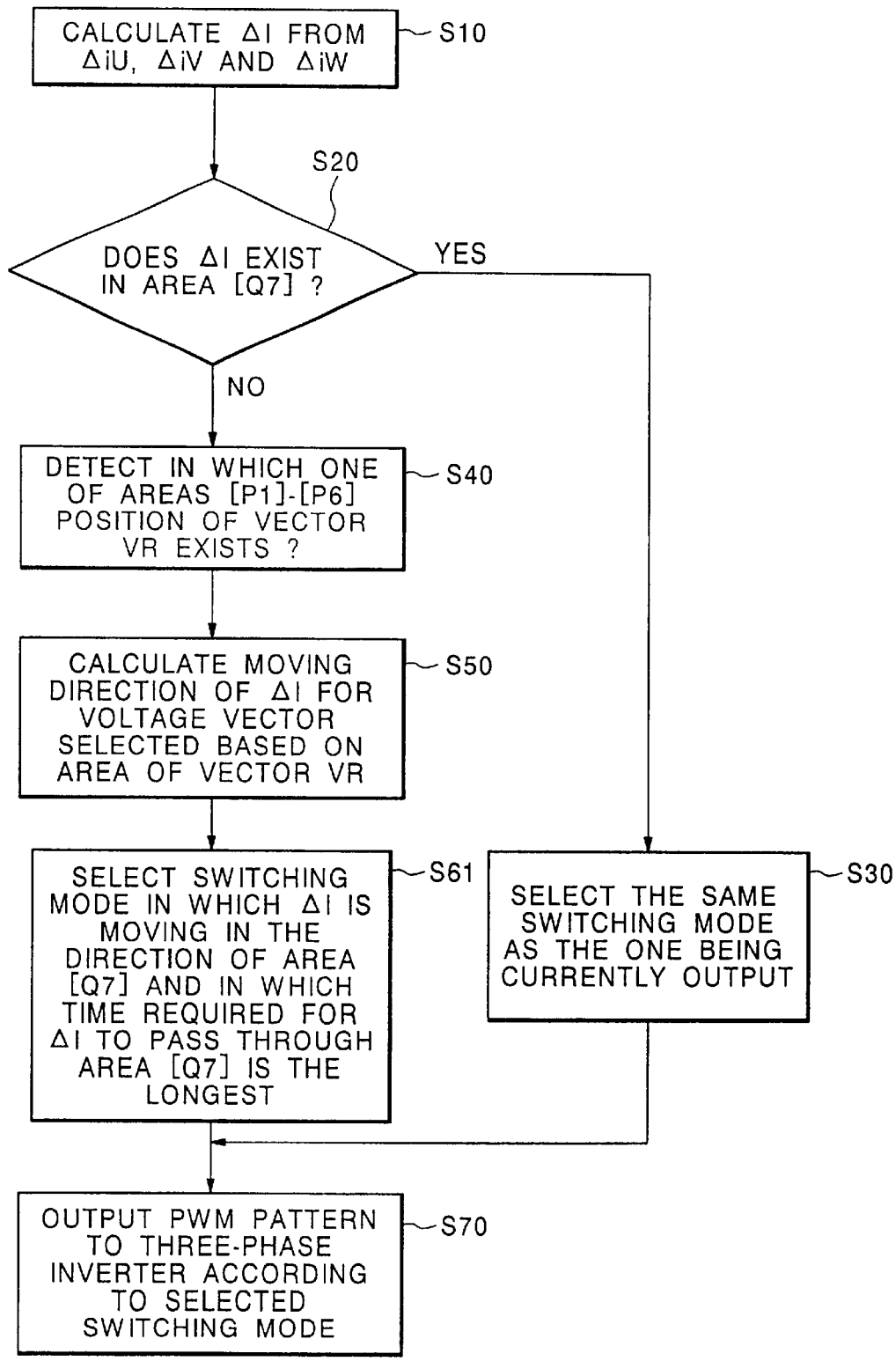
FIG. 7 is a flow chart showing the processing operation of the second embodiment of the present invention.

FIG. 7 is a flow chart which shows the processing operation of a gate array according to a second embodiment of the present invention, wherein a switching mode is selected such that the change interval thereof becomes longer than those of the other switching modes.

In FIG. 7, the processing operation according to this second embodiment is different from the processing operation according to the above-mentioned first embodiment (see FIG. 3) only in that the processing content of step S60 in FIG. 3 is partially changed into a new step S61, with the other processing steps S10 through S50 and S70 remaining unchanged as in the first embodiment.

First of all, when the commercial power supply voltage deviation vector VR does not exist in the area [Q7], the current deviation vector ΔI is calculated in step S50.

Subsequently, a switching mode with the longest change interval (i.e., the period of time required for the current deviation vector ΔI to pass (move) through the area [Q7]) is selected among switching modes in which the current deviation vector ΔI is moving in the direction of the area [Q7] (step S61).

The reason for this is as follows. That is, if the switching mode corresponding to a difference vector with the longest passing-through time of the current deviation vector ΔI with respect to the area [Q7] is selected, the period of time for which the current deviation vector ΔI is staying in the area [Q7] becomes the longest, so that the longest interval can be taken from the time at which the current deviation vector ΔI comes into the area [Q7] until it comes out of the area [Q7] to require a change of the switching mode.

Here, referring to FIG. 6, let us consider the case in which when there are two or more switching modes in which the current deviation vector ΔI is moving in the direction of the area [Q7], which one of the switching modes should be selected in order to make the longest the change interval of the switching mode.

If the difference vector is VL0 or VL3 when the current deviation vector ΔI is in the position "A" in FIG. 6, the current deviation vector ΔI will move in the direction of the area [Q7] as previously stated, and in this case, a comparison will be made between these difference vectors VL0 and VL3 with particular reference to their passing-through times for the area [Q7].

As can be seen from the above-mentioned expression (4), a change per unit time of the current deviation Δi is proportional to the difference between the commercial power supply voltage (vector) VR and the inverter output voltage (vector) VA, so the moving speed of the current deviation vector ΔI is proportional to the magnitude of the difference vector VL0 or VL3.

Accordingly, the passing-through times TVL0, TVL3 of the difference vectors VL0, VL3 for the area [Q7] are calculated by the following expressions (5) and (6), respectively.

$$TVL0 = 1/L \times (\text{length of segment "AB"})/VL0 \quad (5)$$

$$TVL3 = 1/L \times (\text{length of segment "AC"})/VL3 \quad (6)$$

As can be seen from the expressions (5) and (6) above, in case of FIG. 6, the passing-through time TVL0 of the difference vector VL0 becomes longer than the passing-through time TVL3 of the difference vector VL3, so it will be understood that the switching mode k0 or K7 corresponding to the difference vector VL0 or k7 should be selected.

Therefore, in step S61 in FIG. 7, the switching mode, in which the current deviation vector ΔI is moving in the direction of the area [Q7] and in which the time required for the current deviation vector ΔI to pass through the area [Q7] is the longest, is selected.

Thus, by selecting an optimal switching mode for the current deviation vector ΔI to come into the allowable range (area [Q7]), not only unnecessary switching can be avoided but also the interval for changing the switching mode can be made longer, thereby making it possible to further reduce the number of times of switchings.

Third Embodiment

Although in the above-mentioned second embodiment, the output voltage vector VA of the three-phase inverter 1 has been limited based on the area of the commercial power supply voltage vector VR, in cases where the current deviation vector ΔI is large, it may be impossible to select the output voltage vector VA of the three-phase inverter 1 from among the limited voltage vectors.

Thus, it may be constructed such that the output voltage vector VA of the three-phase inverter 1 is not limited based solely on the area of the commercial power supply voltage vector VR, but preferentially selected based on the area of commercial power supply voltage vector VR, and voltage vectors not selected can be optionally selected.

According to such a construction, even when the current deviation vector ΔI is extremely large, an optimum voltage vector can be output.

Hereinafter, a third embodiment of the present invention will be described with reference to the accompanying drawings in which the inverter output voltage vector VA is preferentially selected based on the area of the commercial power supply voltage vector VR.

First of all, reference will be made to the case, while referring to FIG. 8, in which it is impossible to select any switching mode even with the use of the above-mentioned step S61 (see FIG. 7).

Figure 8:
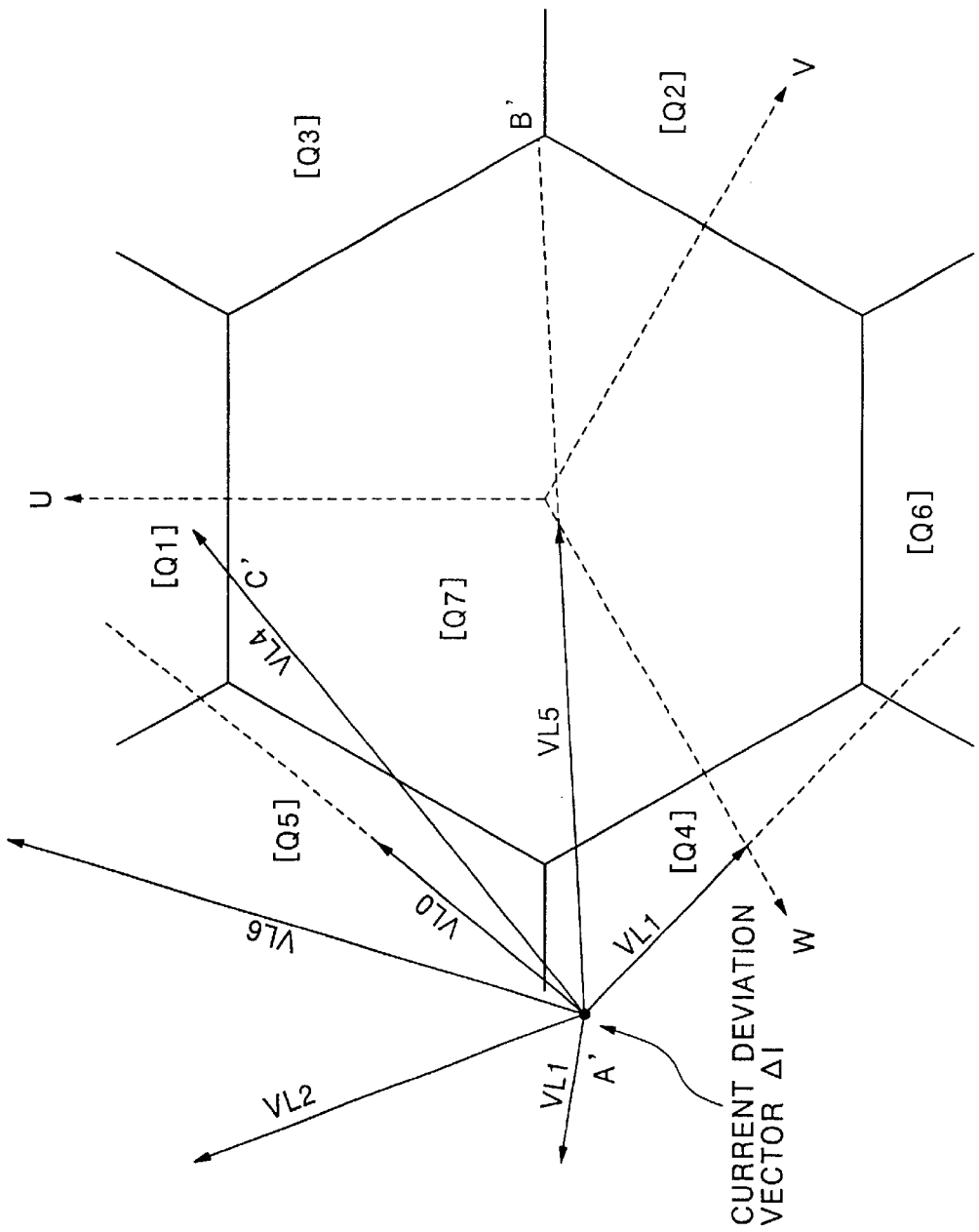
FIG. 8 is a vector diagram explaining switching modes selected according to a third embodiment of the present invention.

FIG. 8 is a vector diagram showing that the current deviation vector ΔI is located at a position "A'" far away from the area [Q7].

For instance, in cases where the commercial power supply voltage vector VR is within the area [P1] and the current deviation vector ΔI is located at the position "A'" in FIG. 8, the current deviation vector ΔI does not move in the direction of the area [Q7] even if any of the voltage vectors V0, V1, V3 and V7 limited according to FIG. 4 is output, so that any of the switching modes cannot be selected in step S61 in FIG. 7.

As is clear from FIG. 8, when the current deviation vector ΔI is located at the position "A'", it is necessary to select a voltage vector V4 which exists in the direction of a position "C'" or a voltage vector V5 which exists in the direction of a position "B'".

Accordingly, the voltage vector is not limited from the area [P1] of the commercial power supply voltage vector VR, but instead the voltage vector of FIG. 4 is preferentially output by the following processing.

Figure 9:
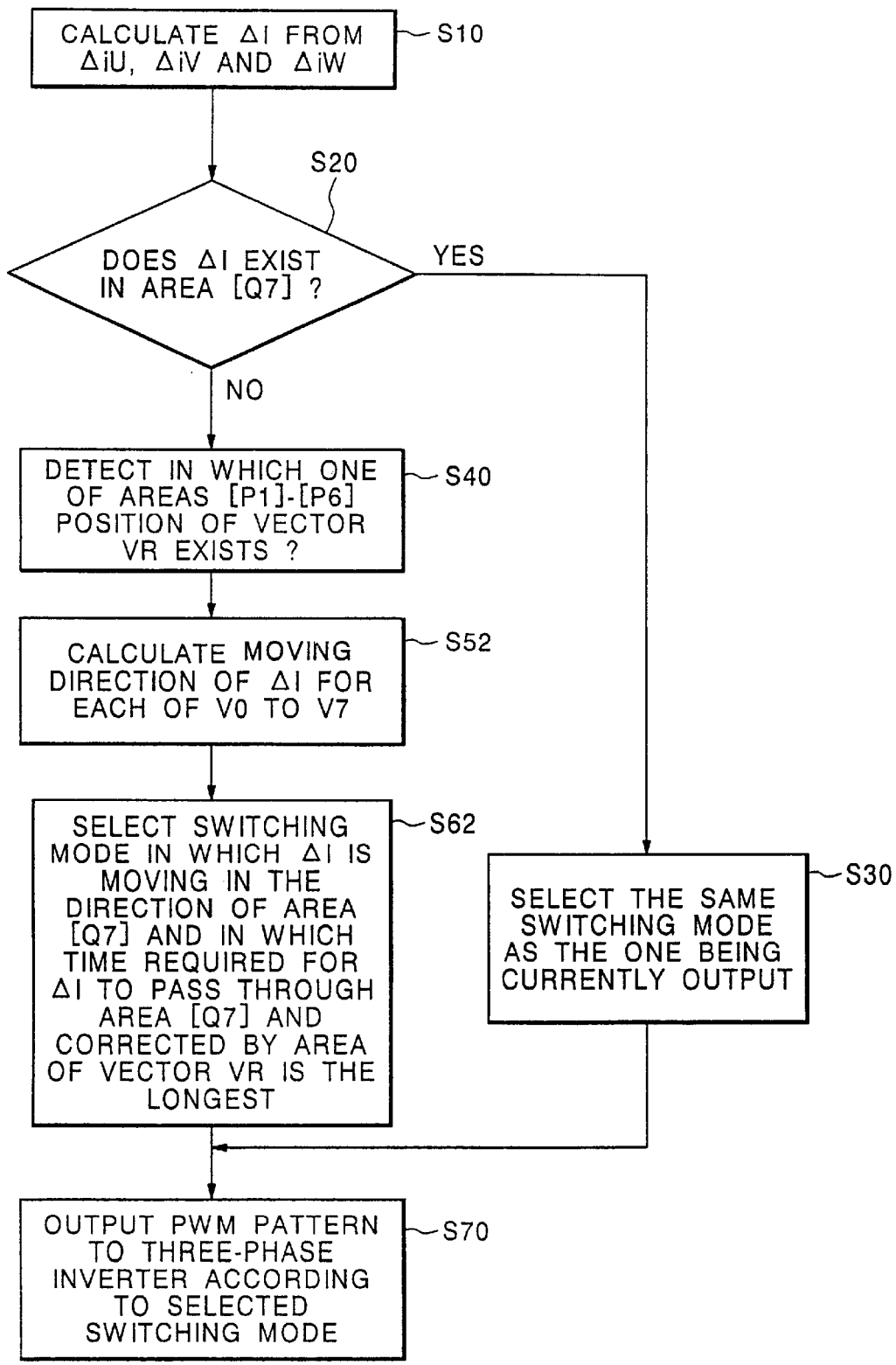
FIG. 9 is a flow chart showing the processing operation of the third embodiment of the present invention.

FIG. 9 is a flow chart which shows the processing operation of the gate array according to the third embodiment of the present invention.

In FIG. 9, the processing operation according to this third embodiment is different from the processing operation according to the above-mentioned second embodiment (see FIG. 7) only in that the processing contents of steps S50 and S61 in FIG. 7 are partially changed into new steps S52 and S62, respectively, with the other processing steps S10 through S40 and S70 remaining unchanged as in the second embodiment.

In this case, after the area of the commercial power supply voltage vector VR is detected in step S40, it is determined in which direction the current deviation vector ΔI is moving, with respect to each case where the three-phase inverter 1 outputs each of the voltage vectors V0–V7 (step S52).

Subsequently, in step S62, the passing-through time for the area [Q7] of each voltage vector which is moving in the direction of the area [Q7] is calculated as in step S61, and at this time, weighting processing is carried out.

That is, the passing-through times when the voltage vectors selected in FIG. 4 are output are weighted for instance by a factor of ten (ten times) based on the area of the commercial power supply voltage vector VR.

Also, weighting by a factor of one (one time) is done for voltage vectors which have not been selected.

Thereafter, the voltage vector whose passing-through time after the weighting processing has been carried out becomes the longest is selected and output.

As a result, the voltage vectors selected in FIG. 4, as weighted by a factor of ten, are preferentially output, but when the current deviation vector ΔI does not come into the area [Q7] even with the selected voltage vectors alone, the voltage vectors, weighted by a factor of one (one time), other than the selected voltage vectors can be output.

For instance, when the current deviation vector ΔI deviates greatly from the area [Q7] as shown in FIG. 8, voltage vectors VL4 and VL5 which are moving in the direction of the area [Q7] will first be selected, and the voltage vector VL5 with the longest passing-through time will then be selected.

Consequently, unnecessary switching can be avoided, and the current deviation vector ΔI, even if large, will come into the allowable range (area [Q7]), so it is possible to select an appropriate switching mode.

Fourth Embodiment

Although the above-mentioned first through third embodiments have used the three-phase sinusoidal wave current instruction generation circuit 801 (see FIG. 1), a three-phase sinusoidal wave voltage instruction generation circuit may instead be employed with a voltage control circuit interposed between the three-phase sinusoidal wave voltage instruction generation circuit and the PWM pattern selector circuit 811.

Hereinafter, reference will be made to a fourth embodiment of the present invention using the three-phase sinusoidal wave voltage instruction generation circuit.

Figure 10:
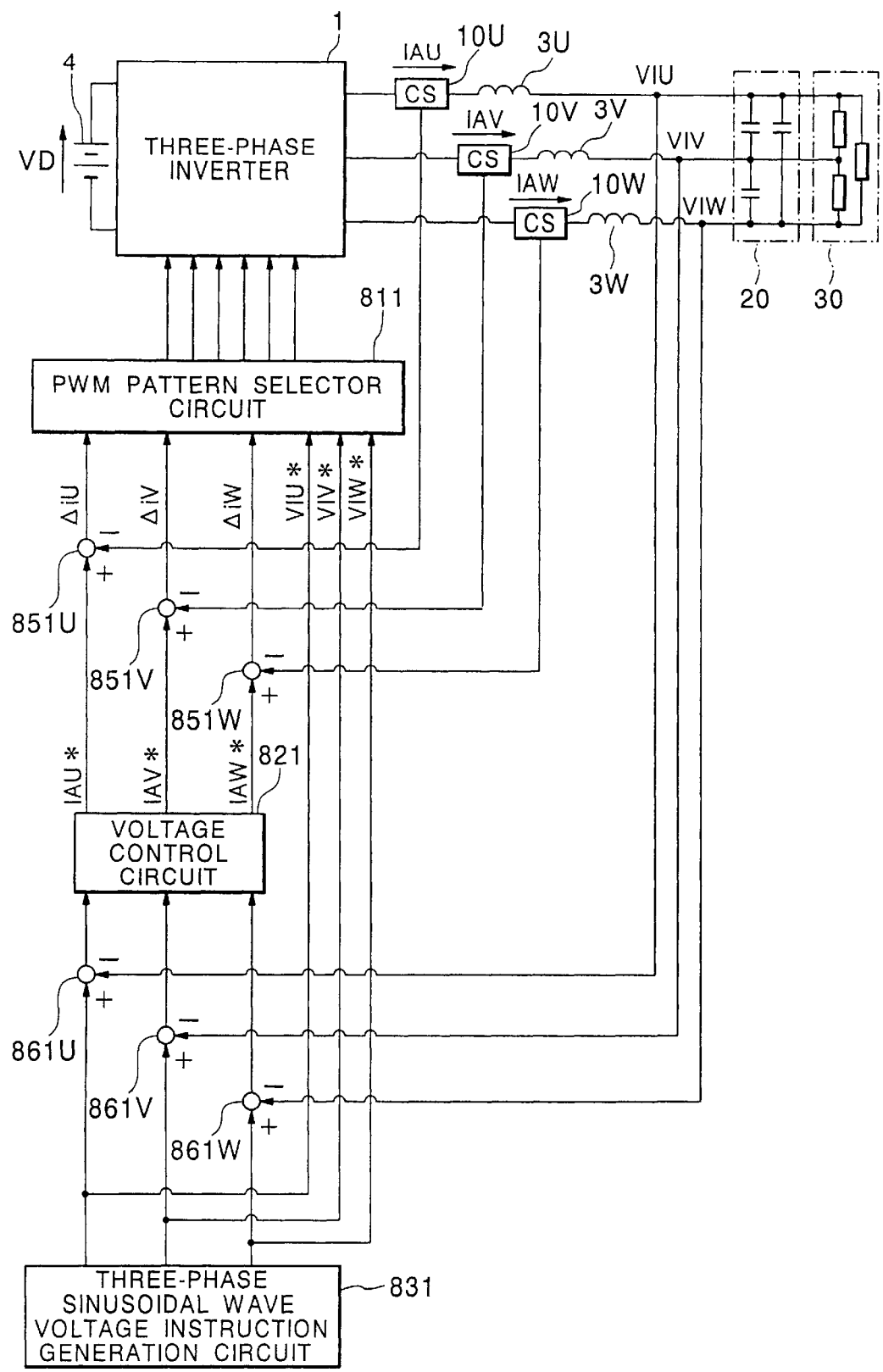
FIG. 10 is a block diagram showing a fourth embodiment of the present invention.

FIG. 10 is a block diagram which shows the circuit structure of the fourth embodiment of the present invention.

In FIG. 10, the same or corresponding parts of this embodiment as those of the aforementioned first embodiment (see FIG. 1) are identified by the same symbols while omitting a detailed description thereof.

A three-phase filter capacitor 20 is connected with the output side of the three-phase inverter 1 for removing harmonic components from the rectangular wave voltage output from the three-phase inverter 1.

An arbitrary load 30 is connected with an output side of the three-phase filter capacitor 20, and consumes the three-phase AC electric power output from the three-phase inverter 1.

A three-phase sinusoidal wave voltage instruction generation circuit 831 generates voltage instruction values VIU*, VIV* and VIW*.

A voltage control circuit 821 is inserted between the three-phase sinusoidal wave voltage instruction generation circuit 831 and the PWM pattern selector circuit 811 for generating current instruction values IAU*–IAW*.

Adder-subtracters 861U, 861V and 861W are inserted between the three-phase sinusoidal voltage instruction generation circuit 831 and the voltage control circuit 821.

The voltage control circuit 821 cooperates with the adder-subtracters 861U–861W to constitute a voltage loop for controlling the instantaneous magnitude of the output voltages of the three-phase inverter 1.

In addition, the adder-subtracters 861U–861W cooperate with the three-phase sinusoidal voltage instruction generation circuit 831 to constitute a voltage deviation detection means for calculating voltage deviations (voltage deviation vector) between the voltage instruction values VIU*–VIW* for the voltage loop and the voltage feedback values VIU–VIW.

At this time, the voltage control means 821 outputs current instruction values IAU*–IAW* so as to decrease the voltage deviation vector.

Moreover, the voltage control circuit 821 functions as a voltage control means for outputting current instruction values IAU*–IAW* to the current loop in accordance with the voltage deviation vector.

In addition, the adder-subtracters 851U–851W cooperate with the voltage control circuit 821 to function as a current deviation vector detection means for calculating current deviations ΔiU–ΔiW between the current instruction values IAU*–IAW* and the current feedback values IAU–IAW from the current sensors 10U–10W, respectively.

The PWM pattern selector circuit 811 selects a PWM pattern for the three-phase inverter 1 in accordance with the current deviations ΔiU–ΔiW and the voltage instruction values VIU*–VIW*.

That is, the PWM pattern selector circuit 811 sets an allowable deviation range for the current deviation vector ΔI, selects a switching mode based on the current deviation vector ΔI and the voltage instruction values VIU*–VIW*, and outputs a corresponding PWM pattern, as previously described.

Next, reference will be made to the control operation of the fourth embodiment of the present invention, as shown in FIG. 10.

First, the adder-subtracters 861U–861W in the voltage loop calculate the voltage deviation vector between the voltage instruction values VIU*–VIW* generated from the three-phase sinusoidal wave voltage instruction generation circuit 831 and the output voltages VIU–VIW of the three-phase inverter 1.

The voltage control circuit 821 outputs the current instruction values IAU*–IAW* to the PWM pattern selector circuit 811 so as to decrease the calculated voltage deviation vector.

On the other hand, the voltage instruction values VIU*–VIW* from the three-phase sinusoidal wave voltage instruction generation circuit 831 are input to a commercial power supply voltage input portion of the PWM pattern selector circuit 811.

Here, note that the basic operations of the PWM pattern selector circuit 811 and the three-phase inverter 1 are similar to those of the above-mentioned embodiments, and hence a description thereof is omitted.

Thus, the voltage loop is constructed by using the three-phase sinusoidal wave voltage instruction generation circuit 831, the voltage control circuit 821 and the adder-subtracters 861U–861W, so that a constant three-phase sinusoidal wave voltage can be supplied to the load 30.

Fifth Embodiment

Although the above-mentioned first through fourth embodiments have been described with the presumption that the current instruction values IAU*–IAW* for the three-phase inverter 1 are constant, the current instruction values IAU*–IAW* are in actuality changing over time and are not constant.

Thus, changes in the current instruction values IAU*–IAW* may be taken into consideration such that when the amounts of changes per unit time of the current instruction values IAU*–IAW* are large (i.e., larger than predetermined values), the commercial power supply voltages VRU–VRW (voltage feedback values) in FIG. 1 or the voltage instruction values VIU*–VIW* in FIG. 10 are corrected by the products of the time derivatives of the current instruction values IAU*–IAW* and the inductance value L of the reactors 3U–3W, respectively.

Now, reference will be made to the processing operation of a fifth embodiment of the present invention in which changes in the current instruction values IAU*–IAW* are taken into consideration, while referring to a vector diagram in FIG. 11 together with the above-mentioned FIGS. 1 through 10.

First, the amounts of changes per unit time of the current instruction values IAU*–IAW* will be described.

For instance, when the inductance value L of the reactors 3U–3W increases, the amount of change per unit time of the actual inverter current IA decreases, and hence the accounts of changes per unit time of the inverter current instruction values IAU*–IAW* become relatively greater, so that the amounts of changes per unit time of the current instruction values IAU*–IAW* cannot be ignored.

In addition, in the above-mentioned fourth embodiment, when a change in the current consumed by the load 30 (see FIG. 10) is large, the amounts of changes per unit time of the current instruction values IAU*–IAW* increase, too.

With particular reference to the above-mentioned first embodiment for instance, the following expression (7) is established from the aforementioned expressions (2) and (3) when the change per unit time of the inverter current instruction value IA* is not ignored.

$$\{\Delta i(T1+\Delta T)-\Delta i(T1)\}-\{IA^*(T1+\Delta T)-IA^*(T1)\}=(\Delta T/L) \times (VR-VA) \qquad (7)$$

When both sides of the expression (7) above are divided by a predetermined time ΔT, the following expression (8) will be obtained.

$$[\{\Delta i(T1+\Delta T)-\Delta i(T1)\}/\Delta T]-[\{IA^*(T1+\Delta T)-IA^*(T1)\}/\Delta T]=(VR-VA)/L \qquad (8)$$

When the limit (definition of derivative) of expression (8) above is calculated with the assumption that the predetermined time ΔT on the left side of this expression is an infinitesimal time dt (i.e., lim ΔT→0), the expression (8) is represented by the following expression (9).

$$d(\Delta i)/dt - d(IA^*)/dt = (VR-VA)/L \qquad (9)$$

In addition, when both sides of expression (9) above is multiplied by the inductance value L, the following expression (10) will be obtained.

$$L \times d(\Delta i)/dt - L \times d(IA^*)/dt = VR - VA \qquad (10)$$

Therefore, expression (10) above is transformed into the following expression (11).

$$L \times d(\Delta i)/dt = \{VR + L \times d(IA^*)/dt\} - VA \quad (11)$$

Moreover, when the above-mentioned expression (4) is represented by the form of differentiation, the following expression (12) is established.

$$L \times d(\Delta i)/dt = VR - VA \quad (12)$$

As is apparent from expressions (11) and (12) above, replacing the commercial power supply voltage vector VR in the expression (12) with "VR+L×d (IA*)/dt" in the expression (11) corresponds to taking account of the amount of change in the inverter current instruction value IA*.

That is, the amount of change in the inverter current instruction value IA* can be taken into consideration by replacing the commercial power supply voltage vector VR with "VR+L×d (IA*)/dt".

Figure 11:
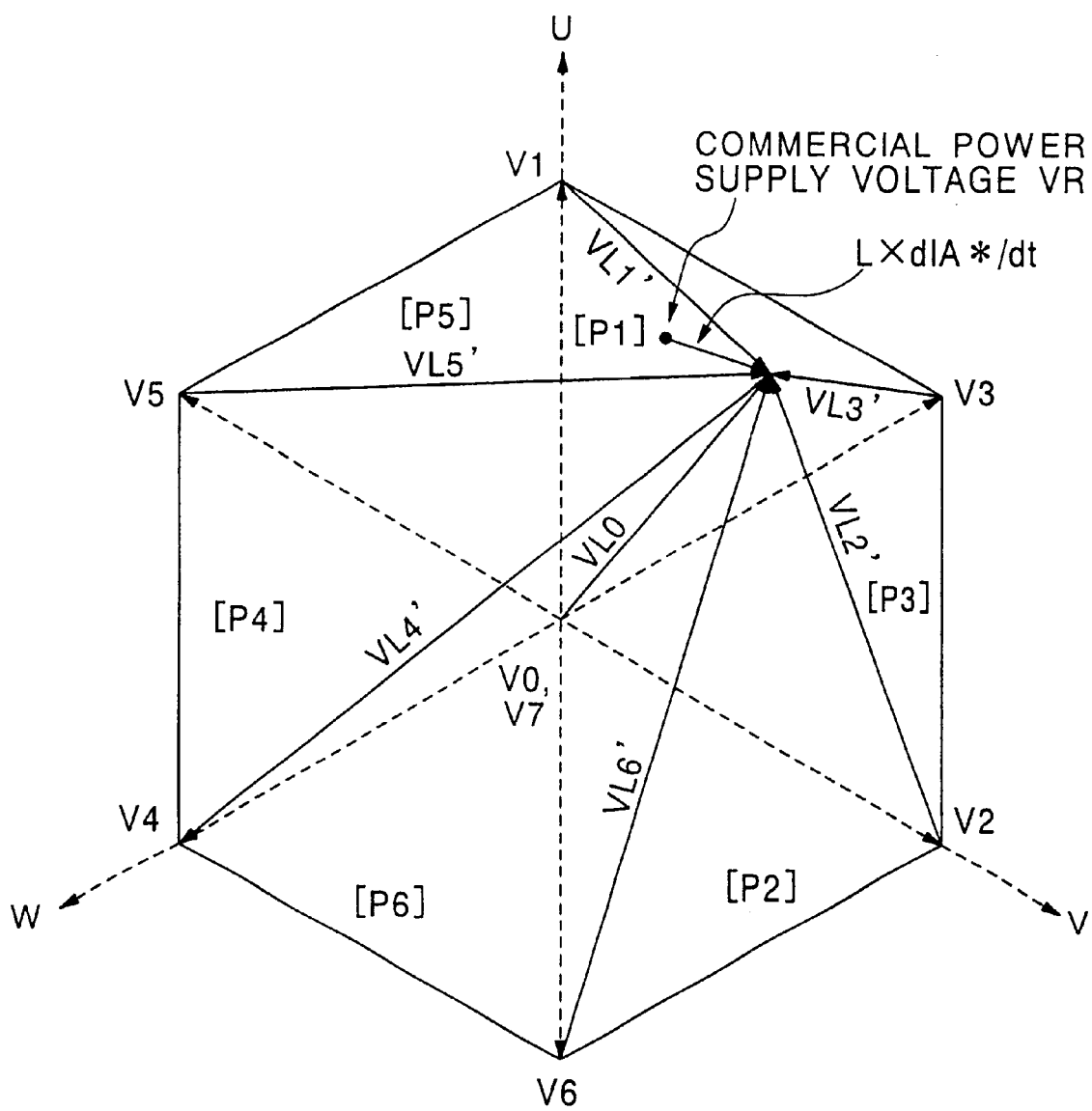
FIG. 11 is a vector diagram explaining switching modes selected according to a fifth embodiment of the present invention.

This is equivalent to moving the commercial power supply voltage vector VR in FIG. 11 by an amount of "L×d (IA*)/dt".

Accordingly, when any of the voltage vectors V0–V7 is selected from the table shown in FIG. 4, the commercial power supply voltage vector VR thus moved is taken as a reference.

In addition, when the current deviation vector ΔI is at a position "A" in FIG. 6, the passing-through times TVL0' and TVL3' of the current deviation vector ΔI for the area [Q7] with respect to the difference vectors VL0' and VL3' are calculated by the following expressions (13) and (14), respectively, as in the above-mentioned expressions (5) and (6).

$$TVL0' = 1/L \times (\text{length of segment "AB"})/VL0' \quad (13)$$

$$TVL3' = 1/L \times (\text{length of segment "AC"})/VL3' \quad (14)$$

The processing operation after the calculations of these passing-through times TVL0' and TVL3' is similar to that of the above-mentioned first embodiment.

Thus, when the amount of change per unit time of the inverter current instruction value IA* is large, the voltage vector VR of the three-phase voltage generator (commercial power supplies) is corrected by the product of the time derivative of the inverter current instruction value IA* and the inductance value L of the reactors 3U–3W, whereby the influence of the change over time of the current instruction value IA* can be alleviated.

That is, even when the amount of change per unit time of the inverter current instruction value IA* is larger than the amount of change per unit time of the inverter current IA, it is possible to select an appropriate switching mode for making the current deviation vector ΔI fall in the allowable range (area [Q7]), thereby avoiding unnecessary switching.

Similarly, when the above procedure is applied to the above-mentioned fourth embodiment (see FIG. 10), the influence of the change over time of the current instruction values IAU*–IAW* can also be alleviated by correcting the voltage instruction values VIU*–VIW* by the product of the time derivative of the current instruction values IAU*–IAW* and the inductance value L of the reactors 3U–3W.

While the invention has been described in terms of preferred embodiments, those skilled in the art will recognize that the invention can be practiced with modifications within the spirit and scope of the appended claims.

What is claimed is:

1. A control circuit of a power converter which includes switching elements switching a plurality of times in one cycle of power that is converted, and which is connected with respective output terminals to a three-phase voltage generator through reactors, said control circuit comprising:
   a current loop having a respective current sensor connected to each of output terminals of a multi-phase power converter for controlling instantaneous magnitude of a corresponding output current of the phases of the power converter;
   current instruction generation means for providing current instruction values to said current loop;
   current deviation vector detection means for calculating a current deviation vector between the current instruction values and corresponding current feedback values from said current sensors;
   voltage detection means for calculating a voltage vector of the three-phase voltage generator; and
   pulse width modulation (PWM) pattern selection means for selecting a PWM pattern for the power converter in accordance with the current deviation vector and the voltage vector, wherein said PWM pattern selection means sets an allowable deviation range for the current deviation vector, and selects a switching mode for the power converter from among switching modes limited by values of the current deviation vector and the voltage vector when the current deviation vector deviates from the allowable deviation range, and, thereby, selects and outputs the PWM pattern.

2. The control circuit of a power converter according to claim 1, wherein said PWM pattern selection means calculates a passing-through time in which the current deviation vector passes through the allowable deviation range, and selects the switching mode in accordance with the passing-through time.

3. The control circuit of a power converter according to claim 2, wherein said PWM pattern selection means weights a specific switching mode determined by values of the voltage vector in accordance with the passing-through time, and preferentially outputs the specific switching mode to the power converter.

4. The control circuit of a power converter according to claim 1, wherein, when changes per unit time of the current instruction values exceed a prescribed change, said voltage detection means corrects the voltage vector with products of time derivatives of the current instruction values and inductances of said reactors, respectively.

5. A control circuit of a power converter which includes switching elements switching a plurality of times in one cycle of power that is converted, and which supplies three-phase AC voltages to a three-phase load through a filter circuit comprising reactors and capacitors, said control circuit comprising:
   a current loop having a current sensor connected to each of output terminals of a multi-phase power converter for controlling an instantaneous magnitude of a corresponding output current of the power converter;
   a voltage loop for controlling instantaneous magnitude of each of output voltages of the power converter;
   voltage instruction generation means for providing voltage instruction values to said voltage loop;
   voltage deviation detection means for calculating voltage deviations between the voltage instruction values and corresponding voltage feedback values, respectively;
   voltage control means for outputting current instruction values for said current loop in accordance with the voltage deviations, respectively;

current deviation vector detection means for calculating a current deviation vector between the current instruction values and corresponding current feedback values from said current sensors; and pulse width modulation (PWM) pattern selection means for selecting a PWM pattern for the power converter in accordance with the current deviation vector and the voltage instruction values, wherein said PWM pattern selection means sets an allowable deviation range for the current deviation vector, and selects a switching mode for the power converter from among switching modes limited by the current deviation vector and the voltage instruction values when the current deviation vector deviates from the allowable deviation range, and, thereby, selects and outputs the PWM pattern, and said voltage control means outputs current instruction values that decrease the voltage deviation vector.

6. The control circuit of a power converter according to claim 5, wherein, when changes per unit time of the current instruction values are larger than a prescribed change, said voltage instruction generation means corrects the voltage instruction values with products of time derivatives of the current instruction values and inductances of said reactors, respectively.

* * * * *